(12) United States Patent
Liu et al.

(10) Patent No.: US 11,934,632 B2
(45) Date of Patent: Mar. 19, 2024

(54) MUSIC PLAYING METHOD AND APPARATUS

(71) Applicant: BEIJING BYTEDANCE NETWORK TECHNOLOGY CO., LTD., Beijing (CN)

(72) Inventors: Chaopeng Liu, Beijing (CN); Liang Ren, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 64 days.

(21) Appl. No.: 17/615,875

(22) PCT Filed: Jun. 29, 2021

(86) PCT No.: PCT/CN2021/103222
§ 371 (c)(1),
(2) Date: Dec. 2, 2021

(87) PCT Pub. No.: WO2022/083169
PCT Pub. Date: Apr. 28, 2022

(65) Prior Publication Data
US 2022/0308739 A1 Sep. 29, 2022

(30) Foreign Application Priority Data
Oct. 22, 2020 (CN) .......................... 202011140467.8

(51) Int. Cl.
*G06F 3/04817* (2022.01)
*G06F 3/0482* (2013.01)
*G06F 16/638* (2019.01)

(52) U.S. Cl.
CPC ........ *G06F 3/04817* (2013.01); *G06F 3/0482* (2013.01); *G06F 16/639* (2019.01)

(58) Field of Classification Search
CPC .. G06F 3/04817; G06F 3/0482; G06F 16/639; G06F 3/165; G06F 3/04812
See application file for complete search history.

(56) References Cited

U.S. PATENT DOCUMENTS

| | | | |
|---|---|---|---|
| 6,248,946 B1 | 6/2001 | Dwek | |
| 2008/0016468 A1 | 1/2008 | Chambers et al. | |
| 2012/0324398 A1* | 12/2012 | Lee | H04N 21/4325 715/810 |

(Continued)

FOREIGN PATENT DOCUMENTS

| | | |
|---|---|---|
| CN | 102420665 A | 4/2012 |
| CN | 102841742 A | 12/2012 |

(Continued)

OTHER PUBLICATIONS

First Office Action dated Feb. 25, 2022 in Chinese Patent Application No. 202011140467.8 (15 pages) with English translation (21 pages).

(Continued)

*Primary Examiner* — Cao H Nguyen

(57) ABSTRACT

Embodiments of the present disclosure provide a music playing method and apparatus. The method includes: displaying a first page of a music application, where the first page includes at least one custom queue, and each custom queue includes at least one piece of music to be played; acquiring a first instruction acting on the custom queue; and playing the music to be played in the custom queue according to the first instruction. The custom queue is displayed on a fixed area of the first page, so that after entering the first page, the user can directly play the music of interest without the need of frequent page skipping, thereby improving the flexibility of music playing.

18 Claims, 10 Drawing Sheets

(56) References Cited

U.S. PATENT DOCUMENTS

| | | | |
|---|---|---|---|
| 2014/0115461 A1 | | 4/2014 | Reznor et al. |
| 2014/0325408 A1* | | 10/2014 | Leppanen ............. G06F 3/0481 715/765 |
| 2018/0329585 A1* | | 11/2018 | Carrigan ............... G06F 3/0362 |
| 2022/0050559 A1 | | 2/2022 | Feng et al. |

FOREIGN PATENT DOCUMENTS

| | | | |
|---|---|---|---|
| CN | 104575545 A | 4/2015 | |
| CN | 104679855 A | 6/2015 | |
| CN | 104978397 A | 10/2015 | |
| CN | 105979379 A | 9/2016 | |
| CN | 106358082 A | 1/2017 | |
| CN | 107301223 A | 10/2017 | |
| CN | 108228547 A | 6/2018 | |
| CN | 110191236 A | 8/2019 | |
| CN | 110362711 A | 10/2019 | |
| CN | 110637465 A | 12/2019 | |
| CN | 111665936 A | 9/2020 | |
| CN | 112256233 A | 1/2021 | |
| EP | 2662789 A2 | 11/2013 | |

OTHER PUBLICATIONS

Second Office Action dated May 10, 2022 in Chinese Patent Application No. 202011140467.8 (12 pages) with English translation (21 pages).

QQ Music Application, Version No. 10.0.0.12, Tencent Music, Jul. 3, 2020, available at https://www.wandoujia.com/search?key=qq%E9%9F%B3%E%B%9010.0.&source=index (14 pages).

International Application No. PCT/CN2021/103222, International Search Report dated Sep. 8, 2021.

Notification to Grant Patent Right for Invention dated May 10, 2022 in Chinese Patent Application No. 202010821430.5 (4 pages) with an English translation (2 pages).

Reexamination Decision dated Apr. 6, 2022 in Chinese Patent Application No. 202010821430.5 (1 page) with an English translation (1 page).

Yue Zou, "S3C2442 and MPEG2-TS in the Multimedia Player Application," Journal of Xinjiang University (Natural Science Edition), vol. 27, No. 3, pp. 353-356, Aug. 2010 with English abstract.

Examination Report dated Sep. 25, 2023 in Indian Application No. 202127043214 (6 pages).

* cited by examiner

MUSIC PLAYING METHOD AND APPARATUS

This application is a National Stage of International Application No. PCT/CN2021/103222, filed on Jun. 29, 2021, which claims priority to Chinese patent application No. 202011140467.8, titled "MUSIC PLAYING METHOD AND APPARATUS" and filed on Oct. 22, 2020. Both of the above applications are incorporated herein by reference in their entireties.

TECHNICAL FIELD

Embodiments of the present disclosure relate to the field of multimedia technology and, in particular, to a music playing method and apparatus, an electronic device, a computer-readable storage medium, a computer program product, and a computer program.

BACKGROUND

With the constant development of music applications, a user can listen to his favorite songs or radio stations in a music application, and the music application can also recommend some playlists for the user to click.

At present, after the user enters the corresponding music application by clicking a terminal device, the music application would recommend some music content for the user. However, the user is not necessarily interested in these recommended music content. So the user needs to initiate a search actively. Therefore, the current music application has poor flexibility of music playing.

SUMMARY

The embodiments of the present disclosure provide a music playing method and apparatus, an electronic device, a computer-readable storage medium, a computer program product, and a computer program, so as to overcome the problem of poor flexibility of music playing in music applications.

In a first aspect, an embodiment of the present disclosure provides a music playing method, including:
   displaying a first page of a music application, where the first page includes at least one custom queue, and each custom queue includes at least one piece of music to be played;
   acquiring a first instruction acting on the custom queue; and
   playing the music to be played in the custom queue according to the first instruction.

In a second aspect, an embodiment of the present disclosure provides a music playing apparatus, including:
   a displaying module, configured to display a first page of a music application, where the first page includes at least one custom queue, and each custom queue includes at least one piece of music to be played;
   an acquiring module, configured to acquire a first instruction acting on the custom queue; and
   a playing module, configured to play the music to be played in the custom queue according to the first instruction.

In a third aspect, an embodiment of the present disclosure provides an electronic device, including: at least one processor and a memory;
   the memory stores a computer-executable instruction;
   the at least one processor executes the computer-executable instruction stored in the memory, so that the at least one processor executes the music playing method according to the above first aspect and any possible designs of the first aspect.

In a fourth aspect, an embodiment of the present disclosure provides a computer-readable storage medium which has a computer-executable instruction stored thereon, and when a processor executes the computer-executable instruction, the music playing method according to the above first aspect and any possible designs of the first aspect is implemented.

In a fifth aspect, an embodiment of the present disclosure provides a computer program product including a computer-executable instruction, where when a processor executes the computer-executable instruction, the music playing method according to the above first aspect and any possible designs of the first aspect is implemented.

In a sixth aspect, an embodiment of the present disclosure provides a computer program, where when a processor executes the computer program, the music playing method according to the above first aspect and any possible designs of the first aspect is implemented.

Embodiments of the present disclosure provide a music playing method and apparatus. In the method, firstly, a terminal device displays a first page of a music application, where the first page includes at least one custom queue, and each custom queue includes at least one piece of music to be played, then the terminal device acquires a first instruction acting on the custom queue, and the terminal device can play the music to be played in the custom queue in response to the first instruction. In the solution of the embodiments of the present disclosure, the custom queue is a queue preset by a user, the user can collect his favorite music in the custom queue in advance, and then the custom queue is displayed on a fixed area of the first page, so that after entering the first page, the user can directly play the music of interest without the need of frequent page skipping, thereby improving the flexibility of music playing.

BRIEF DESCRIPTION OF DRAWINGS

In order to describe the technical solutions in the embodiments of the present disclosure or prior art more clearly, the following will briefly introduce drawings that need to be used in the description of the embodiments or prior art. Obviously, the drawings described below are some embodiments of the present disclosure, and for those of skilled in the art, other drawings can be obtained based on these drawings without paying creative efforts.

DESCRIPTION OF EMBODIMENTS

In order to make the purpose, technical solutions and advantages of embodiments of the present disclosure clearer, the technical solutions in the embodiments of the present disclosure will be described as follows clearly and completely in conjunction with accompanying drawings in the embodiments of the present disclosure. Apparently, the described embodiments are a part rather than all of the embodiments of the present disclosure. Based on the embodiments in the present disclosure, all the other embodiments obtained by those skilled in the art without paying creative efforts shall fall into the protection scope of the present disclosure.

First, the concepts involved in the embodiments of the present disclosure are briefly introduced.

Queue: a music collection, which can include one or more pieces of music for playing. A common queue includes a playlist, an album, a radio station, and so on.

Radio station: a form that a music application recommends personalized music for a user based on an algorithm, in which music can be recommended based on one or more conditions.

Figure 1:
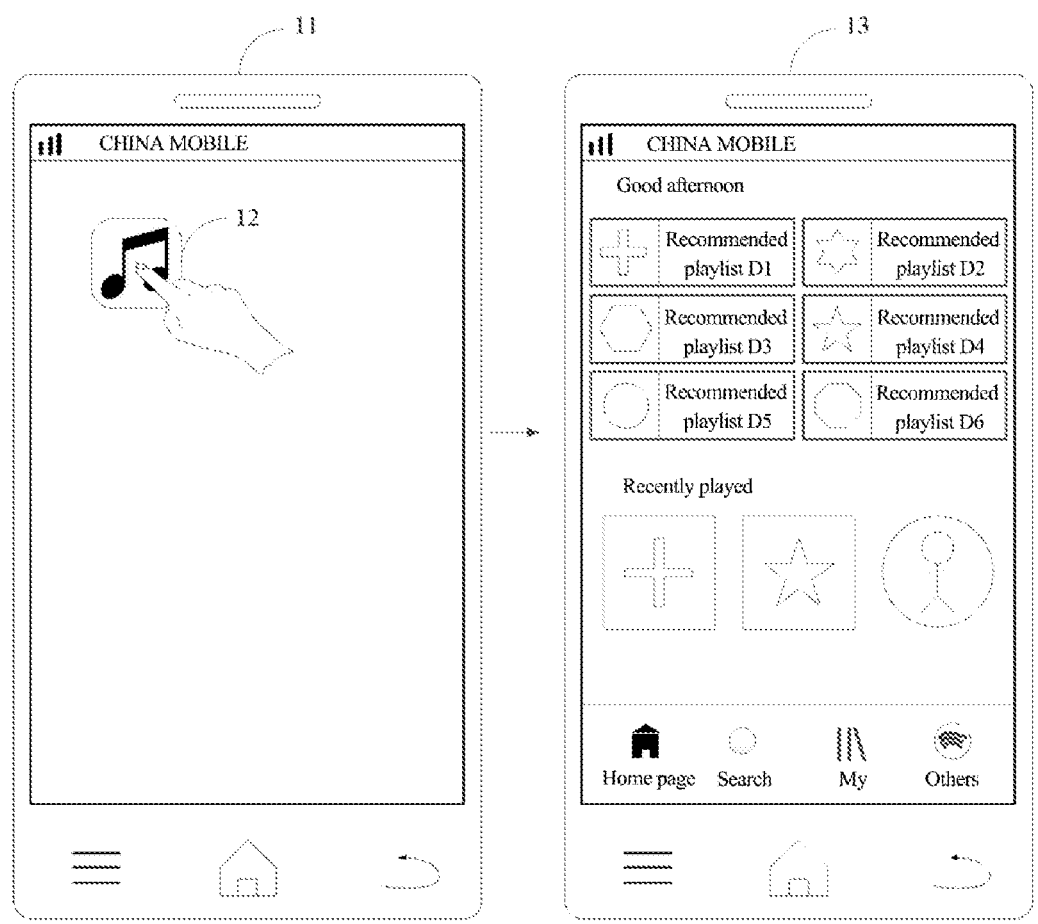
FIG. 1 is a schematic diagram of a music application opened.

FIG. 1 is a schematic diagram of a music application opened. As shown in FIG. 1, an interface 11 is an interface of a terminal device, on which some applications installed on the terminal device, including a music application 12, are displayed.

In the current music application, when a user clicks to enter, the user can enter a page of the music application. As shown in FIG. 1, when the user clicks the music application 12, the terminal device may display an interface 13 as shown on the right side of FIG. 1.

In the interface 13, the top of the interface includes recommended playlists recommended by several music applications for the user. These recommended playlists may be determined according to the user's preferences, or may be determined according to popular songs at the moment. In the interface 13, the bottom of the interface includes several recently played playlists, which are the playlists that the user has recently listened to. The user can click any recommended playlist, and the music application will play the songs in the recommended playlist. The user can also click any of the several recently played playlists, and the music application will play songs in the corresponding playlist.

However, in many cases, the user is not interested in the songs in the above-mentioned recommended playlist or the recently played playlists. At this time, if the user wants to play his favorite songs, he needs to search or find further.

In the current music application, as shown at the bottom of interface 13, there are several clickable interfaces, such as a "Home page" interface, a "Search" interface, a "My" interface and an "Others" interface, where the interface 13 is the page corresponding to the "Home page". When the user wants to play his favorite songs, he can click the "Search" interface to search and play his favorite songs. The user can also collect his favorite songs or playlists in advance, and save them in the "My" interface, so that after entering the music application, the user can click the "My" interface to play the collected songs.

Figure 2:
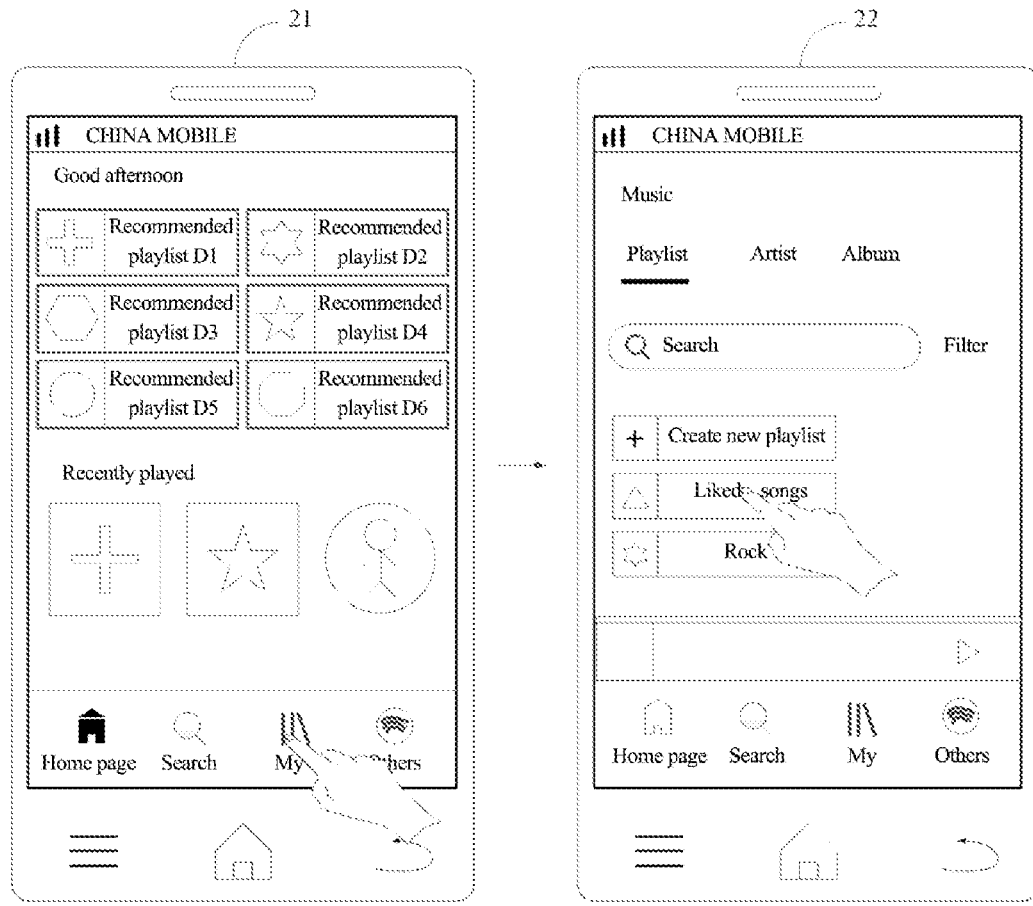
FIG. 2 is a schematic diagram of playing a collected song.

Taking the "My" interface as an example, FIG. 2 is a schematic diagram of playing a collected song. As shown in FIG. 2, an interface 21 is the "Home page" interface. After the user clicks the "My", a corresponding interface 22 is displayed on the terminal device. On the interface 22, there are multiple playlists pre-collected by the user, such as a list of "Liked songs" for collecting songs that the user likes, a list of "Rock" for collecting rock songs that the user likes, and so on. The user can click the corresponding playlist according to his preference to play the songs therein. For example, in FIG. 2, the user clicks the list of "Liked songs", and the music application will play the songs in the list.

FIG. 1 and FIG. 2 together illustrate forms of music playing in the current music application. According to the examples in FIG. 1 and FIG. 2, it can be seen that in the current music application, in many cases, the user is not interested in the playlist recommended for the user by the music application or the playlist recently played by the user. When the user wants to play his favorite songs, he needs to collect them one by one in advance, and has to skip pages frequently when playing, which rendering the operation relatively cumbersome. The above-mentioned solution causes poor flexibility in playing music of the music application.

Based on the above problems, the embodiments of the present disclosure provide a music playing method, which enables favorite songs of a user to be displayed on a page upon the user entering the music application, so that the user can click to play directly, thereby improving the flexibility in music playing of the music application. The solution of the embodiments of the present disclosure will be introduced below in conjunction with the accompanying drawings.

Figure 3:
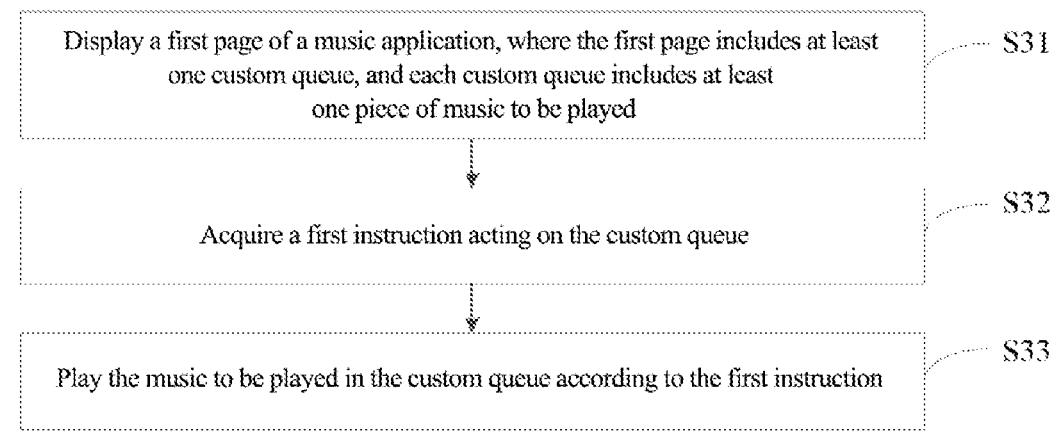
FIG. 3 is a schematic flowchart of a music playing method according to an embodiment of the present disclosure.

FIG. 3 is a schematic flowchart of a music playing method according to an embodiment of the present disclosure. As shown in FIG. 3, the method may include:

S31: display a first page of a music application, where the first page includes at least one custom queue, and each custom queue includes at least one piece of music to be played.

The execution subject body of the music playing method in the embodiment of the present disclosure may be a terminal device, such as a mobile phone, a tablet, and so on. The music application is an application program installed on the terminal device. The music application includes many pieces of music or songs. These pieces of music or songs may exist in a separate form, or belong to a playlist, an album, or a radio station.

The first page is a page in the music application, for example, it may be the first page displayed after entering the music application, or may be another page displayed after page skipping. The custom queue is a queue preset by the user, and the number thereof is one or more. The custom queue can exist in the form of a playlist, an album or a radio station, or in a mixed form. The mixed form here refers that the custom queue can include music from the radio station, the album and the playlist, etc. at the same time. Therefore, for any music to be played in any custom queue, the music to be played can belong to a certain album, a certain radio station, or a certain playlist, or it can be a single song, and so on.

The first page includes at least one custom queue, where the way to display the first page of the music application can be that the user operates the music application to enter the first page, or can be that other pages actively skip to the first page, which is not limited by the embodiments of the present application.

S32: acquire a first instruction acting on the custom queue.

The first instruction is an instruction received by the terminal device, which may be an operation instruction of the user operating the terminal device, or may be other types of instruction forms such as a voice instruction.

S33: play the music to be played in the custom queue according to the first instruction.

After acquiring the first instruction acting on the custom queue, the terminal device can play the music to be played in the custom queue in response to the first instruction.

Embodiments of the present disclosure provide a music playing method. In the method, firstly, a terminal device displays a first page of a music application, where the first page includes at least one custom queue, and each custom queue includes at least one piece of music to be played, then the terminal device acquires a first instruction acting on the custom queue, and the terminal device can play the music to be played in the custom queue in response to the first instruction. In the solution of the embodiments of the present disclosure, the custom queue is a queue preset by a user, the user can collect his favorite music in the custom queue in advance, and then the custom queue is displayed on a fixed area of the first page, so that after entering the first page, the user can directly play the music of interest without the need of frequent page skipping, thereby improving the flexibility of music playing.

The solution of the embodiments of the present disclosure will be introduced in detail below in conjunction with the accompanying drawings.

The queue involved in the embodiments of the present disclosure may be a radio station, an album, a playlist, or other mixed forms. The radio station, album and playlist are different forms of music.

In the embodiment of the present disclosure, the first page is a page in the music application. The first page can be a first page upon entering the music application, or it can be a page that needs to be displayed after the skipping. In an embodiment, the first page may be a home page of the music application. In the following embodiments, the description is made with the first page being the home page of the music application. It should be noted that the first page being the home page is only an example, and it does not mean that the first page can be the home page only. When the first page is the home page of the music application, the user can quickly locate his favorite queue and play after entering the music application, without performing multiple times of page skipping or other operations to play his favorite queue.

Where the displaying the first page of the music application by the terminal device may be to trigger the terminal device to display the first page based on an active operation of the user, or automatically skipping the page of the terminal device and displaying the first page. Description will be given below in conjunction with FIG. 4.

Figure 4:
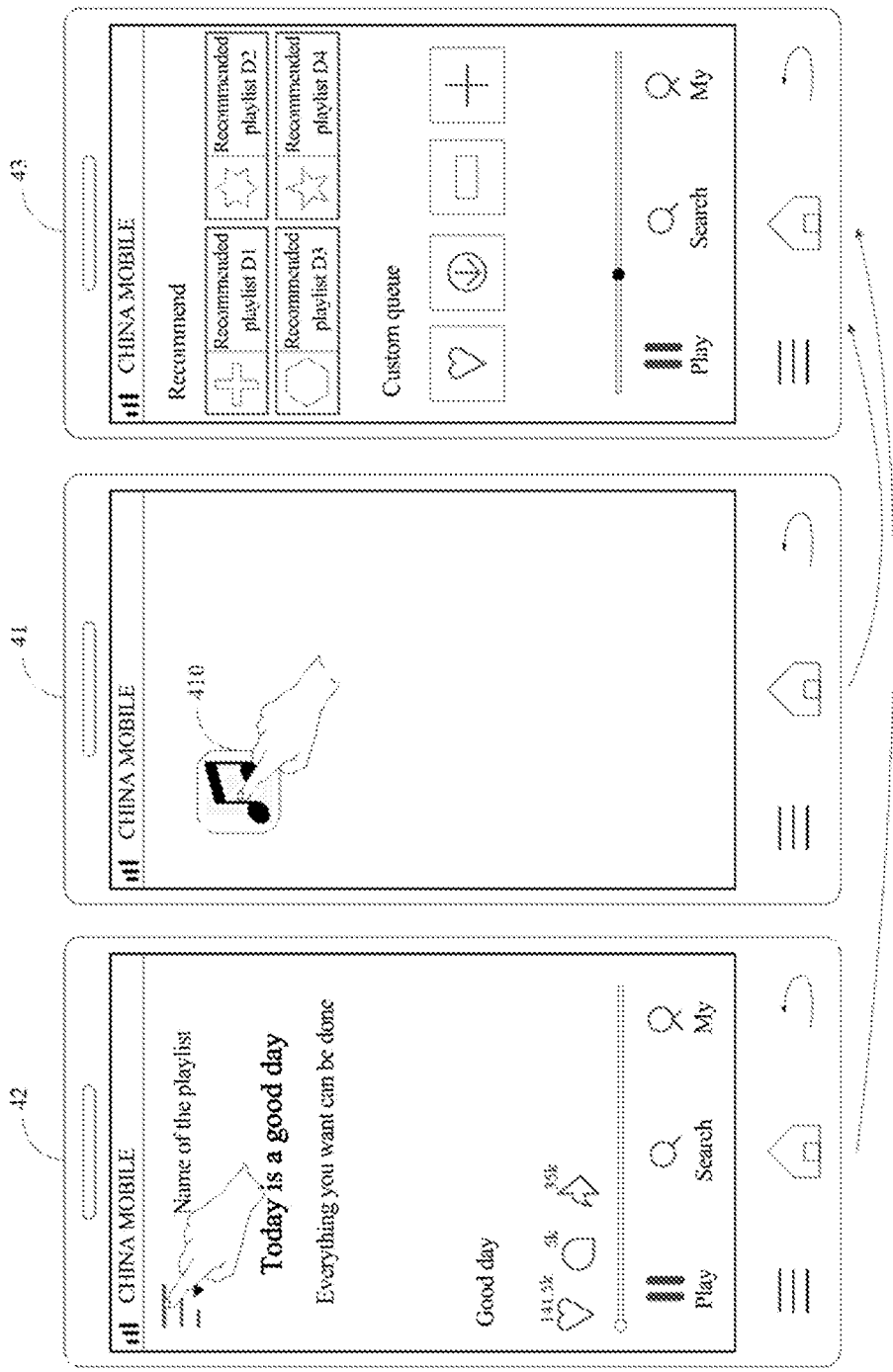
FIG. 4 is a schematic diagram of displaying a first page according to an embodiment of the present disclosure.

FIG. 4 is a schematic diagram of displaying a first page according to an embodiment of the present disclosure. As shown in FIG. 4, several forms of triggering to enter the first page are illustrated. In the example in FIG. 4, the example where the first page is the home page of the music application is taken for description. The home page is shown as the interface 43 on the right side of FIG. 4.

The first form is to directly display the first page after entering the music application, where the entering of the music application can be triggered by the user. For example, the interface 41 in FIG. 4 includes a music application 410. The user can click the music application 410, and the terminal device opens the music application 410 in response to a click operation of the user, then the page displayed by the terminal device is switched from an interface 41 to an interface 43, and the first page is thus displayed.

The second form is to skip to the first page from other pages after entering the music application. As shown in an interface 42 in FIG. 4, the interface 42 is an interface displayed after the music application is opened, and a song is displayed thereon. The song may be a song in a recommended playlist of the music application, and the user can directly click to play. In the second form, there may be two types of skipping situations. The first situation is that the user does not need to perform any operations, and the music application will automatically skip to the interface 43 after displaying the interface 42 to display the first page; the second situation is that the user needs to initiate an operation instruction to realize the skipping. For example, at the upper left of the interface 42, an expansion icon is further included. The user can click the expansion icon, and the terminal device may display the interface 43 in response to the user's operation.

In an embodiment of the present disclosure, the interface 43 displayed by the terminal device includes at least one custom queue, three of which are illustrated in FIG. 4. Since these custom queues are preset by the user, they thus usually save the user's favorite playlists or radio stations, the user can directly click the custom queue on the interface 43 to play the music to be played in the custom queue.

In an embodiment of the present disclosure, at least one custom queue will be displayed on a fixed area on the home page, and each custom queue is preset by the user. For any one of the first custom queues, the method for acquiring the first custom queue may be that the terminal device acquires a second instruction, and acquires the first custom queue according to the second instruction. The second instruction may be a click instruction, a search instruction, or instructions in other forms.

When the second instruction is a click instruction, the terminal device may acquire the first custom queue according to the click instruction acting on the first custom queue. For example, when there is a playlist, album or radio station that the user wants on the page currently displayed by the music application, the user can click directly to add the favorite playlist, album or radio station as a first custom queue.

When the second instruction is a search instruction, the search instruction includes at least one preset condition, and the at least one preset condition is a preset condition set by the user. The terminal device acquires the first custom queue according to the at least one preset condition.

In a possible implementation, the terminal device may determine at least one corresponding sub-queue for each preset condition. The preset condition may be a filtering condition of music set by the user, such as an artist, a genre, an energy, etc. of the music.

After acquiring the at least one sub-queue corresponding to each preset condition, it is possible to take an intersection of the music in the at least one sub-queue corresponding to the each preset condition to acquire the first custom queue.

Figure 5:
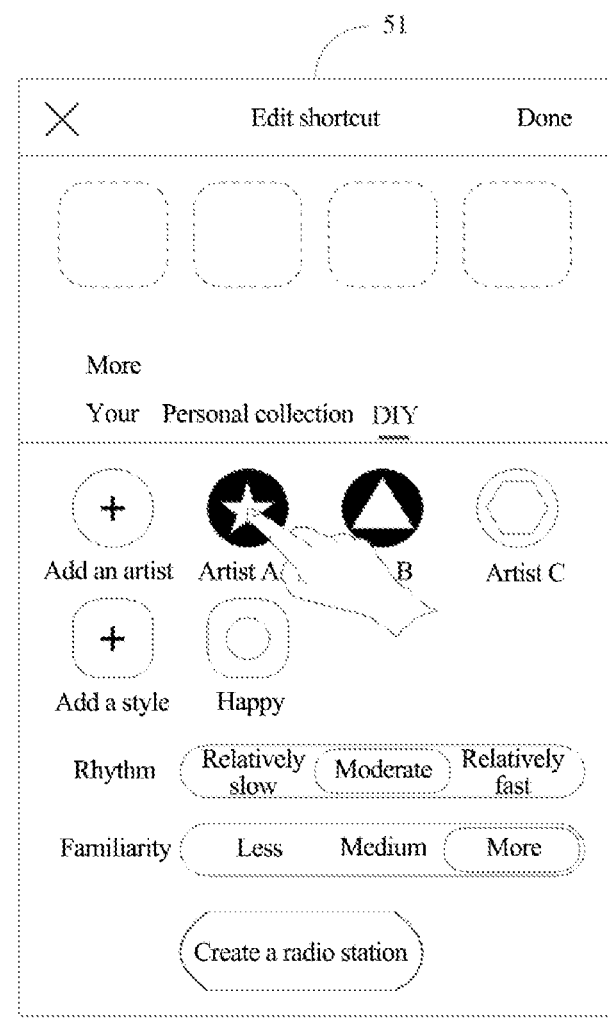
FIG. 5 is a first schematic diagram of acquiring a custom queue according to an embodiment of the present disclosure.

FIG. 5 is a first schematic diagram of acquiring a custom queue according to an embodiment of the present disclosure. As shown in FIG. 5, on an editing interface, the user can set one or more preset conditions. On an interface 51, the settings including three preset conditions are shown, namely artist, rhythm, and familiarity.

In a condition setting area of the artist, three artists are displayed, namely Artist A, Artist B, and Artist C. The user can select one or more of these artists. If the user does not operate in the condition setting area of the artist, all artists will be selected by default. In the condition setting area of rhythm, three rhythm styles are displayed, namely relatively slow, moderate and relatively fast. The user can click to select one of the rhythms according to his needs. In the condition setting area of familiarity, three options are displayed, namely less, medium and more, indicating that among the final filtered music, the user wants more familiar music or more unfamiliar music in which familiarity can be determined by music that the user has searched for or listened to in the history.

In the following, the process is described in which a user creates a radio station to obtain a custom queue with reference to FIG. 5 and FIG. 6. As shown in FIG. 5, the user has selected two artists in the condition setting area of the artist, namely Artist A and Artist B, selected moderate in the condition setting area of rhythm, and selected more in the condition setting area of familiarity. The above three conditions indicate that the user wants the music of Artist A and Artist B with moderate rhythm and of more familiarity for the user. After completing the selection, click the "Create radio station" at the bottom of the screen to generate a new hybrid radio station. The radio station does not exist in the original music application and is generated by the user completely according to his own needs and preferences.

Figure 6:
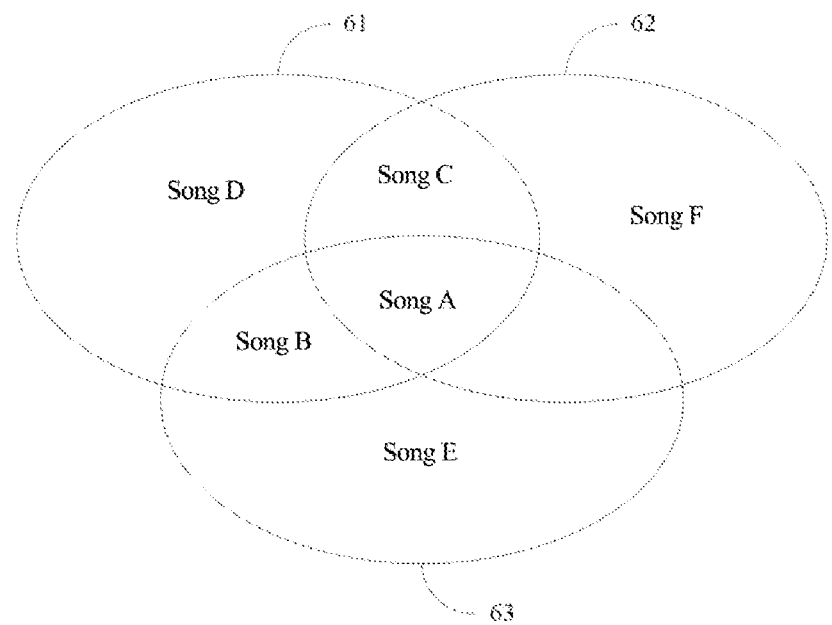
FIG. 6 is a schematic diagram of taking an intersection of sub-queues according to an embodiment of the present disclosure.

FIG. 6 is a schematic diagram of taking an intersection of sub-queues according to an embodiment of the present disclosure. As shown in FIG. 6, it is assumed that there are 6 songs, namely Song A, Song B, Song C, Song D, Song E, and Song F, and information of the 6 songs is as follows:

Song A: Artist (A), rhythm (moderate), familiarity (more);
Song B: Artist (A), rhythm (relatively fast), familiarity (more);
Song C: Artist (B), rhythm (moderate), familiarity (less);
Song D: Artist (B), rhythm (relatively fast), familiarity (less);
Song E: Artist (C), rhythm (relatively fast), familiarity (more);
Song F: Artist (C), rhythm (moderate), familiarity (less).

In FIG. 6, songs in the set 61 are songs whose artist is Artist A or Artist B among the above 6 songs, the set 61 is a sub-queue obtained according to the filtering condition of "Artist A and Artist B", and includes Song A, Song B, Song C and Song D respectively; songs in the set 62 are songs with moderate rhythm among the above 6 songs, the set 62 is a sub-queue obtained according to the filtering condition "Moderate rhythm", and includes Song A, Song C, and Song F respectively; songs in the set 63 are songs that the user used to search for or listen to in the above 6 songs, the set 63 is the sub-queue obtained according to the filtering condition "More familiarity", and includes Song A, Song B, and Song E respectively. In FIG. 6, the songs that the user used to search for or listen to are regarded as the songs with high familiarity for the user.

Take an intersection of the above set 61, set 62, and set 63, and obtain a song whose Artist is Artist A or Artist B, with a moderate rhythm and more familiarity, as shown in FIG. 6, namely Song A.

Therefore, if there are the above 6 songs in a preset music library, after the filtering according to the above 3 preset conditions, the music included in the custom queue obtained by creating a radio station is Song A. After completing the creation, add the radio station to the fixed area on the home page where the custom queue is placed.

It should be noted that the preset conditions illustrated in FIG. 5 and FIG. 6 are only exemplary, and those skilled in the art can set other similar preset conditions, such as a music duration, a music style, and so on.

A new hybrid radio station is created through the filtering with preset conditions, so that the user can obtain, completely according to his actual needs, a custom queue that meets the user's style and needs, to better meet the needs of the user. The music included in the generated custom queue will further increase the viscosity between the user and the music application, thus meeting the personalized needs of the user.

Since the first custom queue acquired by taking the intersection of the sub-queues corresponding to the preset conditions, therefore, the personalized needs of the user are fully met; consequently, in the embodiment of the present disclosure, a solution is further provided to enable the user to collect the created first custom queue, so that the user can find and listen to the first custom queue at any time.

Specifically, the terminal device may acquire a third instruction of the user acting on the first custom queue, and add the first custom queue to a second page of the music application according to the third instruction. The third instruction may be a voice instruction or an operation instruction, and the second page may be a page different from the first page, such as a collected page, a personal page, and so on in the music application.

Figure 7:
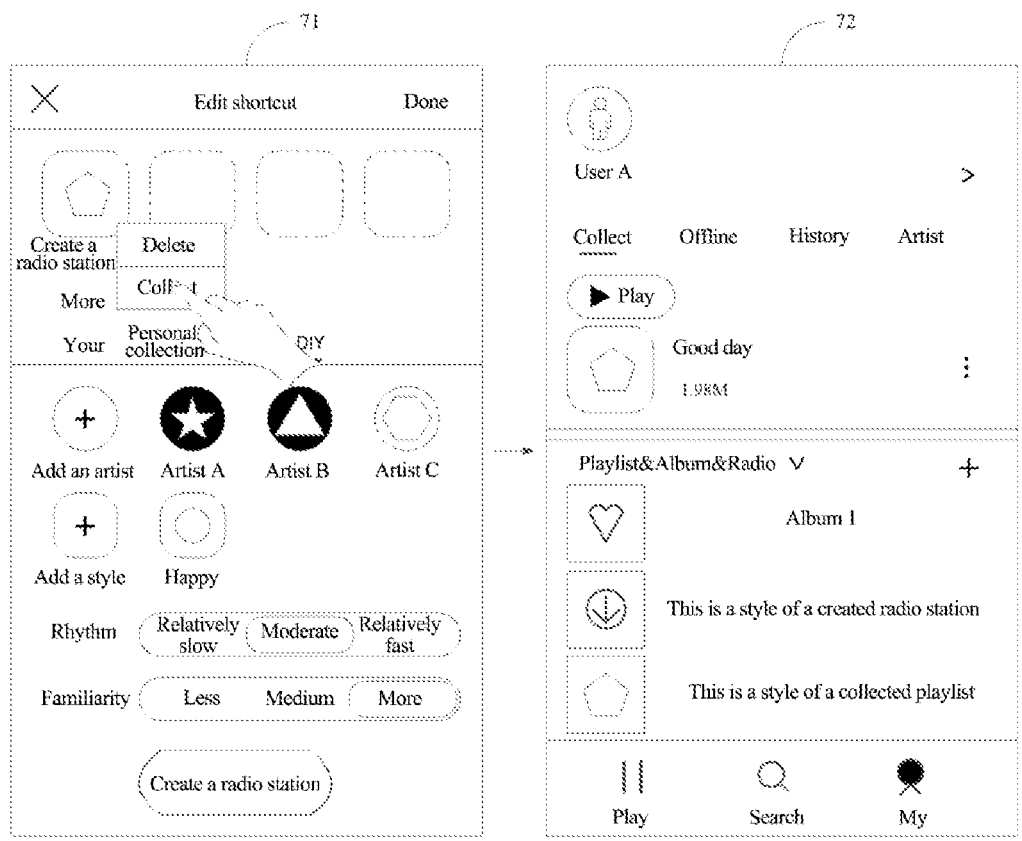
FIG. 7 is a schematic diagram of collecting a custom queue according to an embodiment of the present disclosure.

FIG. 7 is a schematic diagram of a collected custom queue according to an embodiment of the present disclosure. As shown in FIG. 7, on an interface 71, a new radio station created by the user is shown. The filtering conditions used to create the radio station include "Artist A and Artist B", "Moderate rhythm" and "More familiarity".

After the creation is completed, display the new radio station in the fixed area for displaying the custom queue, as illustrated by the new radio station in the upper left corner of the interface 71. At this time, if the user wants to collect the new radio station, he can act on the new radio station. For example, the user can press and hold the area where the new radio station is located, and drop-down options, including "Collect", "Delete", etc., will appear. The user may click the "Collect" option, and then the new radio station can be added to the second page corresponding to the "Collect" option.

In the interface 72 of FIG. 7, the second page corresponding to the "Collect" option is displayed, that is, the "My" page. After the collect is successful, the radio station successfully appears on an interface 72. Every time the user opens the "My" page of the music application subsequently, the new radio station can be displayed on the terminal device to meet the needs of the user.

In FIG. 5 and FIG. 6, an implementation of acquiring a custom queue is illustrated, and another implementation will be introduced below.

In a possible implementation, the preset condition may also be in the form of a keyword. At this time, the terminal device may determine the attribute information of the custom queue according to at least one keyword, and acquire the first custom queue according to the attribute information.

In the embodiment of the present disclosure, the keyword may be some text input by the user, such as a name of an artist, a name of an album, a name of a radio station, or a name of a playlist that the user searches for. In the music application, many different albums, playlists, radio stations, etc. are provided. After the user inputs the corresponding keyword, the terminal device can search a database to display the album, playlist, or radio station that the user may need to find.

Figure 8:
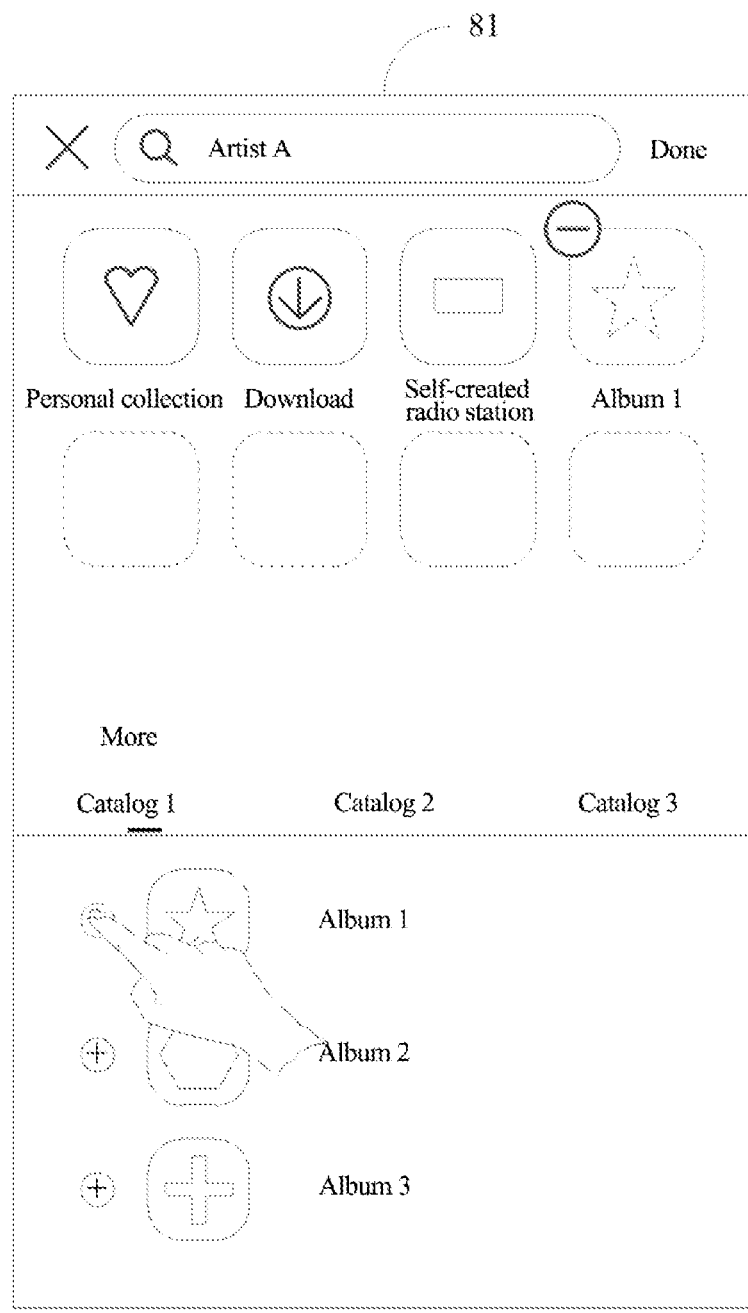
FIG. 8 is a second schematic diagram of acquiring a custom queue according to an embodiment of the present disclosure.

FIG. 8 is a second schematic diagram of acquiring a custom queue according to an embodiment of the present disclosure. As shown in FIG. 8, on a searching interface, the user can input one or more keywords. On an interface 81, the keyword "Artist A" input by the user is illustrated, and multiple music queues corresponding to "Artist A" are displayed at the bottom of the interface 81. For example, a catalog 1 includes 3 albums of the Artist A, a catalog 2 includes 3 concert music of the Artist A, and a catalog 3 includes 3 playlists of the Artist A, and so on.

These music queues are all queues that originally exist in the music application, and are acquired by searching with the keyword. Then, the user can add these searched queues to an area to be added where the custom queue is located. For example, in FIG. 8, in the searched music queue, the user wants to select the album 1 under the catalog 1. In this case, the album 1 can be used as a first custom queue. Then, the user can click the "+" in front of the album 1 to add the album 1 to the area to be added where the custom queue is located, as shown by a dotted box on the interface 81.

In the example of FIG. 8, the music queue obtained by searching with the keyword may be a queue that exists in the music application per se, such as a playlist or an album of a certain artist, or a created radio station. If there are multiple keywords input by the user, a corresponding music queue can be searched for each keyword, and then the intersection of the music queues corresponding to the multiple keywords is taken to obtain the final search result for the multiple keywords. If the final search result includes multiple music queues, the user can also select one or more of them by clicking to add to the area to be added where the custom queue is located. If the final search result does not include any music queue, it is also possible to remind the user to modify the keyword appropriately to obtain a suitable search result.

In the examples in FIG. 5-FIG. 8, it is illustrated how to set up a custom queue. In some cases, the user may set up more than one custom queue, so when displaying on the home page, it is necessary to determine sequences of the custom queues. At the same time, if the number of custom queues set is too large, it is also necessary to select the custom queues to be displayed on the home page due to the limited display area on the home page. The description will be given below combined with the drawings.

Suppose the number of the custom queues set by the user is M, and M is an integer greater than 0. The M custom queues need to be arranged in certain sequences when they are displayed.

In a possible implementation, acquire the sequences of the M custom queues according to a generation time of each custom queue. In this implementation, for example, it is possible to assign a higher rank to a custom queue with an earlier generation time, and assign a lower rank to a custom queue with a later generation time; or, it is also possible to assign a lower rank to the custom queue with an earlier generation time, and assign a higher rank to the custom queue with a later generation time.

In another possible implementation, the user may perform a first operation on the terminal device, and the terminal device acquires the sequences of the M custom queues in response to the first operation of the user.

The first operation can take various forms, including a deleting operation, an adding operation, a moving operation, and so on. Description will be given below combined with FIG. 9.

Figure 9:
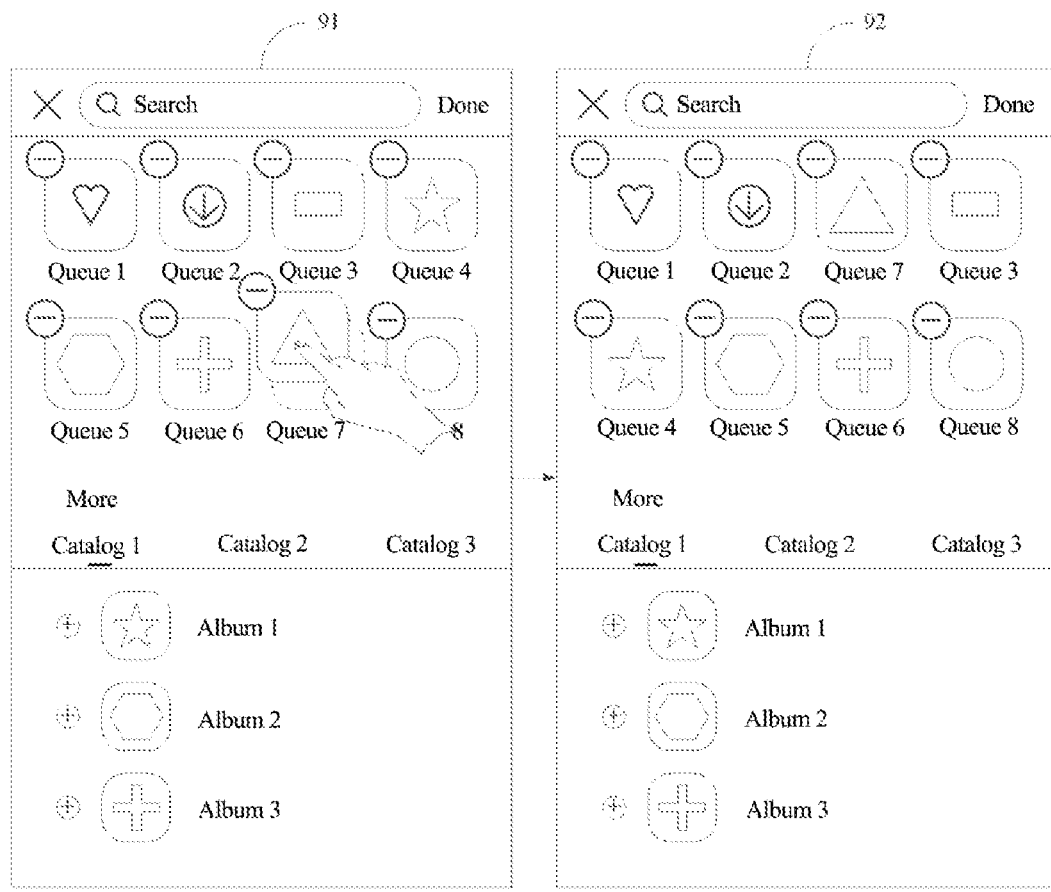
FIG. 9 is a schematic diagram of sequences of custom queues according to an embodiment of the present disclosure.

FIG. 9 is a schematic diagram of sequences of custom queues according to an embodiment of the present disclosure. As shown in FIG. 9, in the fixed area of the custom queue on the interface 91, there are 8 custom queues. The user can press and hold the screen to enter the editing state.

After entering the editing state, a "−" sign appears on the upper left of each custom queue. Clicking this sign means to delete the corresponding custom queue. For example, in FIG. 9, if you click the "−" sign above the Queue 3, it means that the Queue 3 is deleted. The deleting operation can change the sequences of the custom queues. For example, each of the custom queues arranged at the back of the Queue 3 is moved forward by one position.

In the editing state, the addition of a queue can be achieved by clicking the plus sign in front of the queue under the catalog. The custom queue added in this way will be arranged in the last place by default each time it is added. In an embodiment, the user can also directly drag the queue under the catalog to any position in the above fixed area. For example, the area where the Queue 2 is located can be dragged, then the Queue 2 and the queues after the Queue 2 need to be moved backward by one position.

In the editing state, after all the custom queues are selected, it is also possible to adjust the position of the custom queues arbitrarily. For example, in FIG. 9, the user can press and hold to drag the Queue 7 to the area where the Queue 3 is located, thereby changing the sequences of some custom queues. For example, the above operation can make the sequences of the Queue 7 and the Queue 3 interchange without affecting those of others. The above operation can also make the Queue 3 and the queues after the Queue 3 need to be moved backward by one position. In FIG. 9, the example is that the user drags the Queue 7 to the area where the Queue 3 is located. The Queue 3 and the queues after the Queue 3 are all moved backward by one position to obtain an interface 92.

In the above embodiment, it is described that the user can perform the editing operation, such as adding, deleting, and sorting, on the custom queue, thereby finally determining the sequences of the M custom queues.

After the user sets M custom queues, the terminal device displays the first page according to the sequences and the preset M custom queues. Since the display area of the first page is limited, the number of the custom queues displayed on the first page is N, where N is an integer greater than 0, and M is greater than or equal to N.

Specifically, when M is greater than a preset number, determine a preset number of preceding custom queues as the N custom queues according to the sequences, and display the first page according to the N custom queues, in which the preset number of display areas are the display areas allocated to the custom queues on the first page, and the number of custom queues displayed cannot exceed the preset number.

When M is smaller than or equal to the preset number, determine the M custom queues as the N custom queues according to the sequences, and display the first page according to the N custom queues. At this time, since M is less than or equal to the preset number, all of the custom queues can be displayed on the first page.

Figure 10:
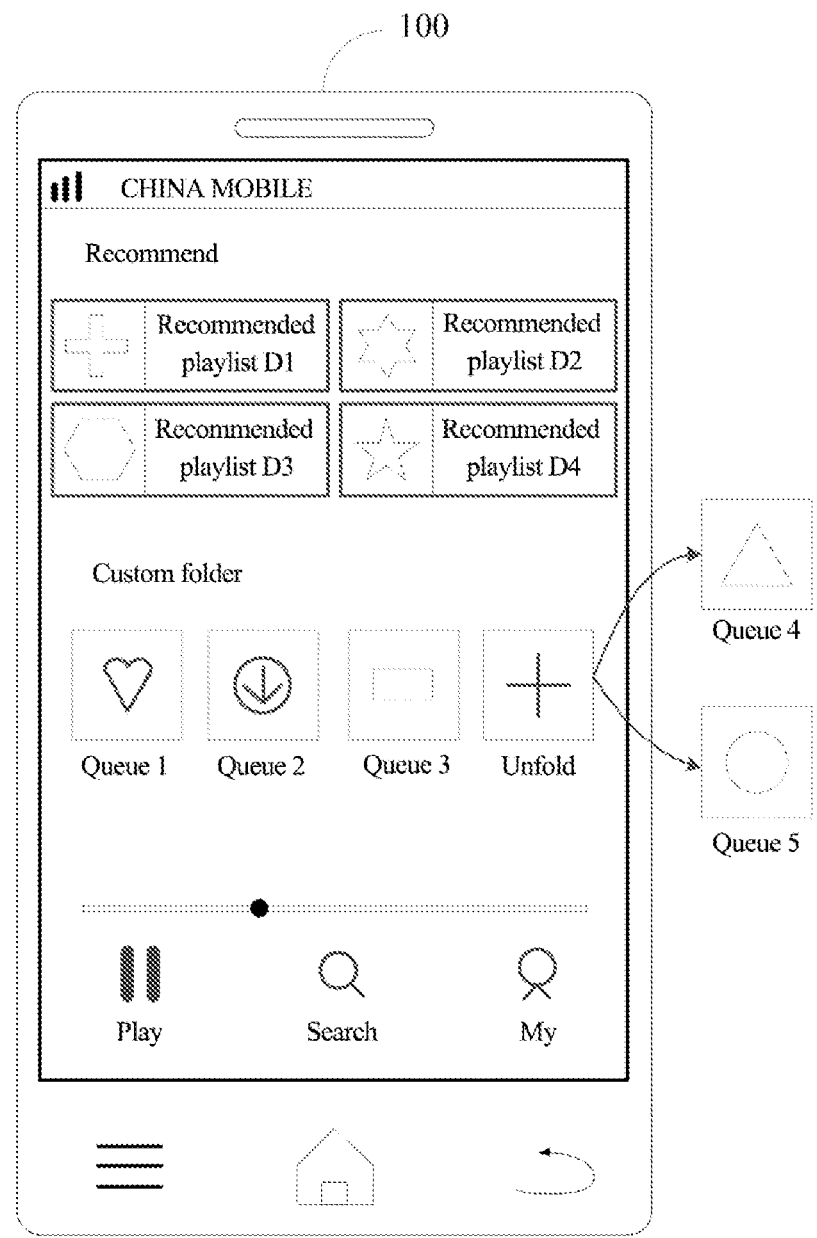
FIG. 10 is a schematic diagram of displaying custom queues according to an embodiment of the present disclosure.

FIG. 10 is a schematic diagram of displaying custom queues according to an embodiment of the present disclosure. As shown in FIG. 10, on the home page 100, the display areas allocated for the custom queues include 3 in total, in which 3 custom queues can be displayed.

Assuming that M=5 at this time, it is impossible to display all of the custom queues on the home page 100. Therefore, it is necessary to acquire the sequences of the 5 custom queues firstly, and select the custom queues with top 3 sequences as the custom queues displayed on the home page 100, that is, the Queue 1, Queue 2, and Queue 3 in FIG. 10. The remaining custom queues, including the Queue 4 and Queue 5 that cannot be displayed exist in folded forms. In FIG. 10, all the custom queues can be seen by clicking the expansion sign "+". Therefore, when the user sets the sequences of the custom queues, he can arrange the custom queue he most wants to listen to in a front position to facilitate the click to play.

After the home page is displayed, the user can perform the corresponding operation on the home page. In an embodiment, in addition to displaying a custom queue, it is also possible to include at least one recommended play queue on the home page. The recommended play queue is a queue recommended by the music application for the user, and each recommended play queue includes at least one piece of music.

The user can click any custom queue or any recommended play queue. The terminal device acquires a click instruction acting on the custom queue or the recommended play queue, and then can play the music in the custom queue or the recommended play queue according to the click instruction.

Figure 11:
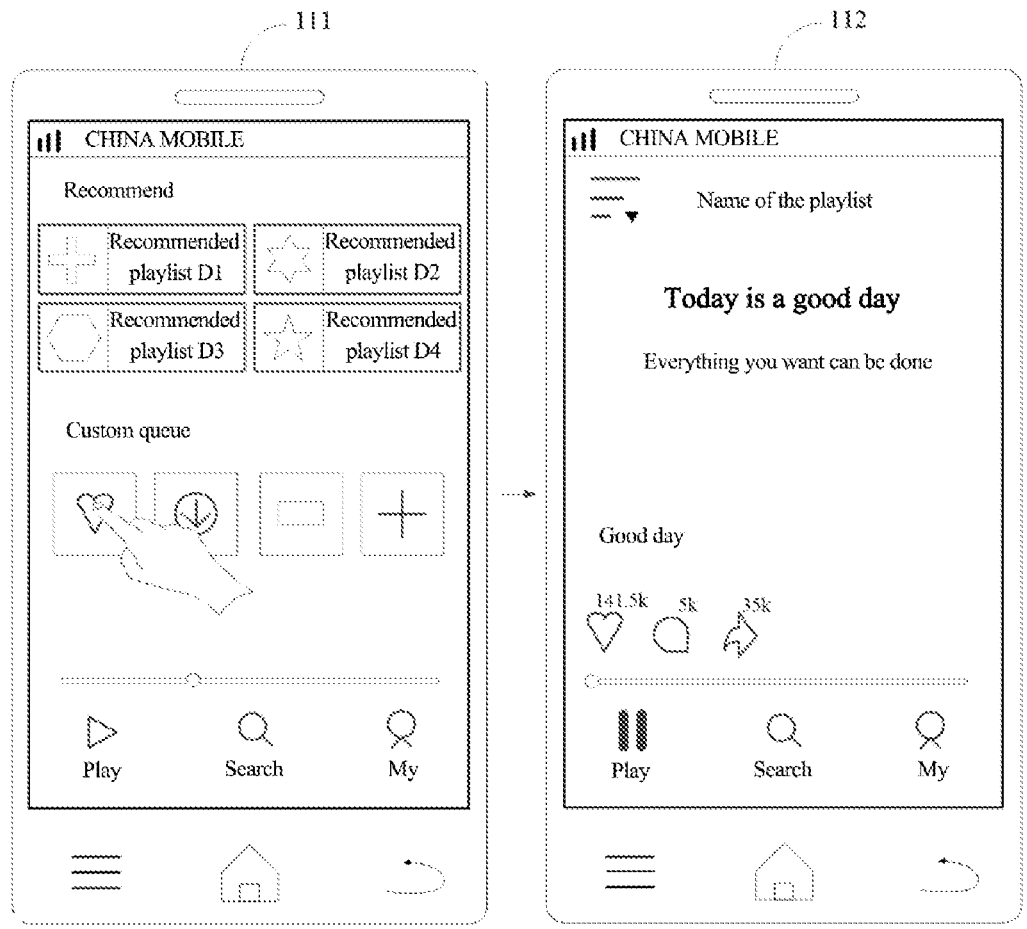
FIG. 11 is a schematic diagram of playing music by clicking according to an embodiment of the present disclosure.

FIG. 11 is a schematic diagram of playing music by clicking according to an embodiment of the present disclosure. As shown in FIG. 11, an interface 111 is the home page of the music application. Four recommended playlists are displayed at the top of the home page, and three custom playlists are displayed in the middle. The user can click any recommended playlist or any custom queue.

In FIG. 11, the user clicks the custom queue in the first position, then the terminal device will play the music to be played in the custom queue at this time, and the interface 111 will switch to an interface 112 at the same time, where related information of a piece of music to be played in the custom queue, including a name of a song, lyrics, play progress, etc., is displayed on the interface 112.

Embodiments of the present disclosure provide a music playing method. In the method, firstly, a terminal device displays a first page of a music application, where the first page includes at least one custom queue, and each custom queue includes at least one piece of music to be played, then the terminal device acquires a first instruction acting on the custom queue, and the terminal device can play the music to be played in the custom queue in response to the first instruction. In the solution of the embodiments of the present disclosure, the custom queue is a queue preset by a user, the user can collect his favorite music in the custom queue in advance, including pre-searching for existing music queues in the music application, or creating a new personalized music queue, and then the custom queue is displayed on a fixed area of the first page, so that after entering the first page, the user can directly play the music of interest without the need of frequent page skipping, thereby improving the flexibility of music playing.

Figure 12:
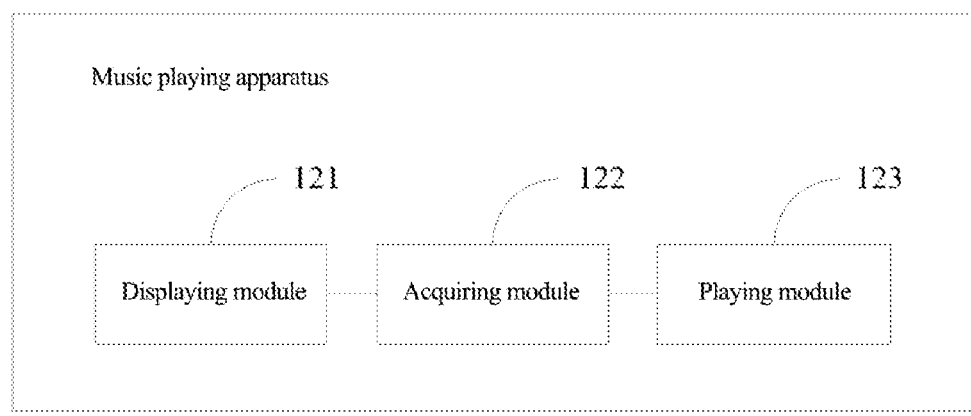
FIG. 12 is a schematic structural diagram of a music playing apparatus according to an embodiment of the present disclosure.

FIG. 12 is a schematic structural diagram of a music playing apparatus according to an embodiment of the present disclosure. As shown in FIG. 12, the device includes:

a displaying module 121, configured to display a first page of a music application, where the first page includes at least one custom queue, and each custom queue includes at least one piece of music to be played;

an acquiring module 122, configured to acquire a first instruction acting on the custom queue; and a playing module 123, configured to play the music to be played in the custom queue according to the first instruction.

In an embodiment of the present disclosure, the displaying module 121 is specifically configured to:

acquire M preset custom queues, where M is an integer greater than 0; and display the first page according to the M custom queues, where the first page comprises N custom queues of the M custom queues, N is an integer greater than 0, and M is greater than or equal to N.

In an embodiment of the present disclosure, for any first custom queue among the M custom queues, the displaying module 121 is specifically configured to:

acquire a second instruction; and acquire the first custom queue according to the second instruction.

In an embodiment of the present disclosure, the second instruction is a click instruction, the displaying module 121 is specifically configured to:

acquire the first custom queue according to the click instruction acting on the first custom queue.

In an embodiment of the present disclosure, the second instruction is a search instruction, and the displaying module 121 is specifically configured to:

acquire at least one preset condition in the search instruction; and acquire the first custom queue according to the at least one preset condition.

In an embodiment of the present disclosure, the displaying module 121 is specifically configured to:

for each preset condition, determine at least one sub-queue corresponding to the preset condition; and take an intersection of the music to be played in the at least one sub-queue corresponding to the each preset condition to acquire the custom queue.

In an embodiment of the present disclosure, the acquiring module 122 is further configured to:

acquire a third instruction acting on the first custom queue; and add the first custom queue to a second page of the music application according to the third instruction.

In an embodiment of the present disclosure, the displaying module 121 is specifically configured to:

determine attribute information of the custom queue according to at least one keyword; and acquire the first custom queue according to the attribute information.

In an embodiment of the present disclosure, the displaying module 121 is specifically configured to:

acquire sequences of the M custom queues; and display the first page according to the sequences and the M custom queues.

In an embodiment of the present disclosure, the displaying module 121 is specifically configured to:

when M is greater than a preset number, determine a preset number of preceding custom queues as the N custom queues according to the sequences, and display the first page according to the N custom queues;

when M is smaller than or equal to the preset number, determine the M custom queues as the N custom queues according to the sequences, and display the first page according to the N custom queues.

In an embodiment of the present disclosure, the displaying module 121 is specifically configured to:

acquire the sequences of the M custom queues according to a generation time of the each custom queue; or, in response to a first operation of a user, acquire the sequences of the M custom queues.

In an embodiment of the present disclosure, the first page is a home page of the music application.

In an embodiment of the present disclosure, the queue is a radio station, an album, or a playlist.

The device provided in this embodiment can be used to implement the technical solutions of the above method embodiments, and the implementation principles and technical effects thereof are similar, which will not be repeated here in this embodiment.

Figure 13:
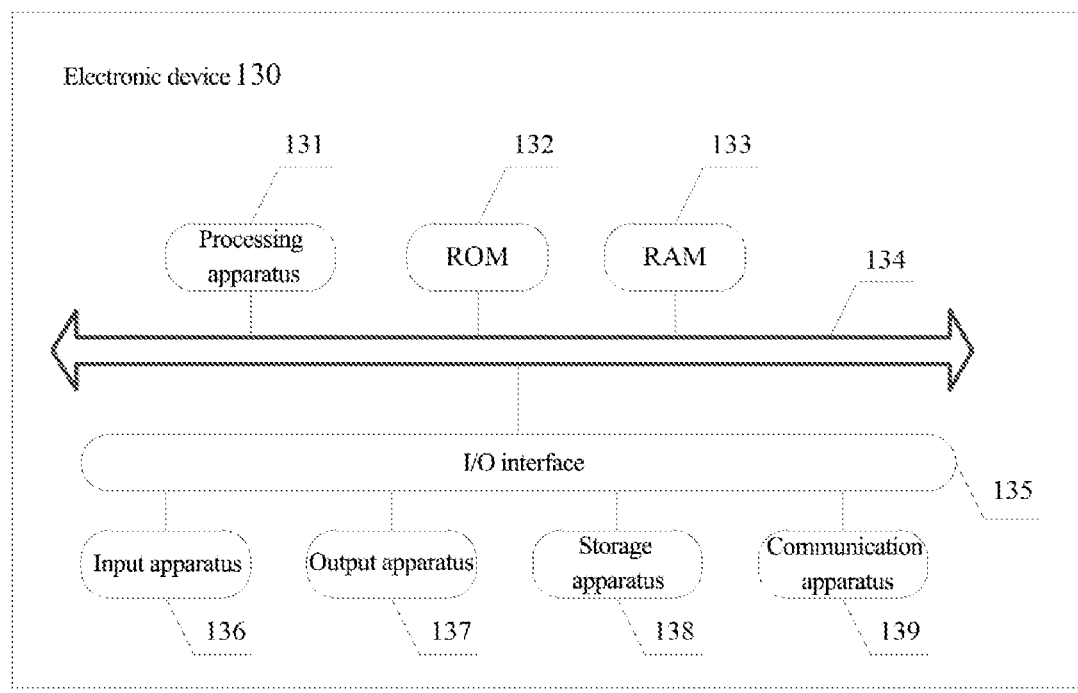
FIG. 13 is a schematic structural diagram of an electronic device according to an embodiment of the present disclosure.

FIG. 13 is a schematic structural diagram of an electronic device according to an embodiment of the present disclosure. Please refer to FIG. 13, which shows an electronic device 130 adapted to implement the embodiments of the present disclosure. The electronic device 130 may be a terminal device or a server. The terminal device may include, but is not limited to, a mobile phone, a notebook computer, a digital broadcast receiver, a personal digital assistant (PDA for short), a portable android device (PAD for short), a portable media player (PMP for short), a vehicle terminal (for example, a vehicle navigation terminal) and a fixed terminal such as a digital TV, a desktop computer, etc. The electronic device shown in FIG. 13 is only an example, and should not bring any limitation to the function and scope of use of the embodiments of the present disclosure.

As shown in FIG. 13, the electronic device 130 may include a processing apparatus (such as a central processor, a graphics processor, etc.) 131, which may perform various appropriate actions and processing according to a program stored in a read-only memory (ROM) 132 or a program loaded from a storage apparatus 138 to a random access memory (RAM) 133. In the RAM 133, various programs and data required for the operation of the terminal device 130 are also stored. The processing apparatus 131, the ROM 132, and the RAM 133 are connected to each other through a bus 134. An input/output (I/O) interface 135 is also connected to the bus 134.

Generally, the following apparatuses may be connected to the I/O interface 135: an input apparatus 136, including for example a touch screen, a touch panel, a keyboard, a mouse, a camera, a microphone, a accelerometer, a gyroscope, and the like; an output apparatus 137, including for example a liquid crystal display (LCD), a speaker, a vibrator, and the like; a storage apparatus 138, including for example a magnetic tape, a hard disk, and the like; and a communication apparatus 139. The communication apparatus 139 may allow the electronic device 130 to perform wireless or wired communication with other devices to exchange data. Although FIG. 13 shows the electronic device 130 with multiple kinds of apparatuses, it is not required to implement or have all the apparatuses shown in FIG. 13. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer readable medium, and the computer program contains program codes for executing the method shown in the flowchart. In such an embodiment, the computer program may be downloaded from a network and installed through the communication apparatus 139, or installed from the storage apparatus 138, or installed from the ROM 132. When the computer program is executed by the processing apparatus 131, the above-mentioned functions defined in the method of the embodiment of the present disclosure are executed. An embodiment of the present disclosure further includes a computer program, when the computer program runs on the electronic device, the electronic device executes the above-mentioned functions defined in the method of the embodiments of the present disclosure.

It should be should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM), a flash memory, an optical fiber, a compact disc read-only memory (CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a radio frequency (RF), etc., or any suitable combination of the above.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to execute the method shown in the above-mentioned embodiments.

The computer program code used to perform operations of the present disclosure may be written in one or more programming languages or a combination thereof. The above-mentioned programming languages include an object-oriented programming language—such as Java, Smalltalk, C++, and also include a conventional procedural programming language—such as "C" language or similar programming language. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (LAN) or a wide area network (WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments of the present disclosure may be implemented in software or hardware. Where a name of a unit does not constitute a limitation on the unit itself in one case. For example, a first acquiring unit may also be described as "a unit that acquires at least two Internet Protocol addresses".

The functions described herein above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium that may contain or store programs for use by or in combination with an instruction execution system, apparatus or device. The machine readable medium may be a machine readable signal medium or a machine readable storage medium. The machine readable medium may include, but is not limited to, an electronic, magnetic, optical, electromagnetic, infrared, or semiconductor system, apparatus or device, or any suitable combination of the above. More specific examples of the machine readable storage medium will include an electrical connection based on one or more lines, a portable computer disk, a hard disk, a random access memory (RAM), a read only memory (ROM), an erasable programmable read only memory (EPROM), a flash memory, an optical fiber, a portable compact disc read-only memory (CD-ROM), an optical storage device, a magnetic storage device, or any suitable combination of the above.

In a first aspect, according to one or more embodiments of the present disclosure, a music playing method is provided, including:

displaying a first page of a music application, where the first page includes at least one custom queue, and each custom queue includes at least one piece of music to be played;

acquiring a first instruction acting on the custom queue; and playing the music to be played in the custom queue according to the first instruction.

According to one or more embodiments of the present disclosure, the displaying the first page of the music application includes:

acquiring M preset custom queues, where M is an integer greater than 0; and displaying the first page according to the M custom queues, where the first page comprises N custom queues of the M custom queues, N is an integer greater than 0, and M is greater than or equal to N.

According to one or more embodiments of the present disclosure, for any first custom queue among the M custom queues, the acquiring the first custom queue includes:

acquiring a second instruction; and acquiring the first custom queue according to the second instruction.

According to one or more embodiments of the present disclosure, the second instruction is a click instruction, and the acquiring the first custom queue according to the second instruction includes:

acquiring the first custom queue according to the click instruction acting on the first custom queue.

According to one or more embodiments of the present disclosure, the second instruction is a search instruction, and the acquiring the first custom queue according to the second instruction includes:

acquiring at least one preset condition in the search instruction; and acquiring the first custom queue according to the at least one preset condition.

According to one or more embodiments of the present disclosure, the acquiring the first custom queue according to the at least one preset condition includes:

for each preset condition, determining at least one sub-queue corresponding to the preset condition; and taking an intersection of the music to be played in the at least one sub-queue corresponding to the each preset condition to acquire the custom queue.

According to one or more embodiments of the present disclosure, the method further includes:

acquiring a third instruction acting on the first custom queue; and adding the first custom queue to a second page of the music application according to the third instruction.

According to one or more embodiments of the present disclosure, the acquiring the first custom queue according to the at least one preset condition includes:

determining attribute information of the custom queue according to at least one keyword; and acquiring the first custom queue according to the attribute information.

According to one or more embodiments of the present disclosure, the displaying the first page according to the M custom queues includes:

acquiring sequences of the M custom queues; and displaying the first page according to the sequences and the M custom queues.

According to one or more embodiments of the present disclosure, the displaying the first page according to the sequences and the M custom queues includes:

when M is greater than a preset number, determining a preset number of preceding custom queues as the N custom queues according to the sequences, and displaying the first page according to the N custom queues; and when M is smaller than or equal to the preset number, determining the M custom queues as the N custom queues according to the sequences, and displaying the first page according to the N custom queues.

According to one or more embodiments of the present disclosure, the acquiring the sequences of the M custom queues includes:

acquiring the sequences of the M custom queues according to a generation time of the each custom queue; or, in response to a first operation of a user, acquiring the sequences of the M custom queues.

According to one or more embodiments of the present disclosure, the first page is a home page of the music application.

According to one or more embodiments of the present disclosure, the queue is a radio station, an album, or a playlist.

In a second aspect, according to one or more embodiments of the present disclosure, a music playing device is provided, including:

a displaying module, configured to display a first page of a music application, where the first page includes at least one custom queue, and each custom queue includes at least one piece of music to be played;

an acquiring module, configured to acquire a first instruction acting on the custom queue; and a playing module, configured to play the music to be played in the custom queue according to the first instruction.

According to one or more embodiments of the present disclosure, the displaying module is specifically configured to:

acquire M preset custom queues, where M is an integer greater than 0; and display the first page according to the M custom queues, where the first page comprises N custom queues of the M custom queues, N is an integer greater than 0, and M is greater than or equal to N.

According to one or more embodiments of the present disclosure, for any first custom queue among the M custom queues, the displaying module is specifically configured to:

acquire a second instruction; and acquire the first custom queue according to the second instruction.

According to one or more embodiments of the present disclosure, the second instruction is a click instruction, and the displaying module is specifically configured to:

acquire the first custom queue according to the click instruction acting on the first custom queue.

According to one or more embodiments of the present disclosure, the second instruction is a search instruction, and the displaying module is specifically configured to:

acquire at least one preset condition in the search instruction; and acquire the first custom queue according to the at least one preset condition.

According to one or more embodiments of the present disclosure, the displaying module is specifically configured to:

for each preset condition, determine at least one sub-queue corresponding to the preset condition; and take an intersection of the music to be played in the at least one sub-queue corresponding to the each preset condition to acquire the custom queue.

According to one or more embodiments of the present disclosure, the acquiring module is further configured to:

acquire a third instruction acting on the first custom queue; and add the first custom queue to a second page of the music application according to the third instruction.

According to one or more embodiments of the present disclosure, the displaying module is specifically configured to:

determine attribute information of the custom queue according to at least one keyword; and acquire the first custom queue according to the attribute information.

According to one or more embodiments of the present disclosure, the displaying module is specifically configured to:

acquire sequences of the M custom queues; and display the first page according to the sequences and the M custom queues.

According to one or more embodiments of the present disclosure, the displaying module is specifically configured to:

when M is greater than a preset number, determine a preset number of preceding custom queues as the N custom queues according to the sequences, and display the first page according to the N custom queues; and when M is smaller than or equal to the preset number, determine the M custom queues as the N custom queues according to the sequences, and display the first page according to the N custom queues.

According to one or more embodiments of the present disclosure, the displaying module is specifically configured to:

acquire the sequences of the M custom queues according to a generation time of the each custom queue; or, in response to a first operation of a user, acquire the sequences of the M custom queues.

According to one or more embodiments of the present disclosure, the first page is a home page of the music application.

According to one or more embodiments of the present disclosure, the queue is a radio station, an album, or a playlist.

In a third aspect, according to one or more embodiments of the present disclosure, an electronic device is provided, including: at least one processor and a memory;

the memory stores a computer-executable instruction;

the at least one processor executes the computer-executable instruction stored in the memory, so that the at least one processor executes the music playing method according to the above first aspect and any possible designs of the first aspect.

In a fourth aspect, according to one or more embodiments of the present disclosure, a computer-readable storage medium is provided. The computer-readable storage medium has a computer-executable instruction stored thereon, and when a processor executes the computer-executable instruction, the music playing method according to the above first aspect and any possible designs of the first aspect is implemented.

The above description is only a preferred embodiment of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by the above technical features or equivalent features without departing from the above disclosed concept, for example, a technical solution formed by replacing the above-mentioned features with the technical features disclosed in the present disclosure (but not limited to) having similar functions.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A music playing method, comprising:
   displaying a first page of a music application, wherein the first page comprises at least one custom queue, and each custom queue comprises at least one piece of music to be played;
   acquiring a first instruction acting on the custom queue; and
   playing the music to be played in the custom queue according to the first instruction;
   wherein the displaying the first page of the music application comprises:
   acquiring M preset custom queues, wherein M is an integer greater than 0; and
   displaying the first page according to the M custom queues, wherein the first page comprises N custom queues of the M custom queues, N is an integer greater than 0, and M is greater than or equal to N.

2. The method according to claim 1, wherein for any first custom queue among the M custom queues, the acquiring the first custom queue comprises:
   acquiring a second instruction; and
   acquiring the first custom queue according to the second instruction.

3. The method according to claim 2, wherein the second instruction is a click instruction, and the acquiring the first custom queue according to the second instruction comprises:
   acquiring the first custom queue according to the click instruction acting on the first custom queue.

4. The method according to claim 2, wherein the second instruction is a search instruction, and the acquiring the first custom queue according to the second instruction comprises:
   acquiring at least one preset condition in the search instruction; and
   acquiring the first custom queue according to the at least one preset condition.

5. The method according to claim 4, wherein acquiring the first custom queue according to the at least one preset condition comprises:
   for each preset condition, determining at least one sub-queue corresponding to the preset condition; and
   taking an intersection of the music to be played in the at least one sub-queue corresponding to the each preset condition to acquire the custom queue.

6. The method according to claim 2, wherein the method further comprises:
   acquiring a third instruction acting on the first custom queue; and
   adding the first custom queue to a second page of the music application according to the third instruction.

7. The method according to claim 4, wherein acquiring the first custom queue according to the at least one preset condition comprises:
   determining attribute information of the custom queue according to at least one keyword; and
   acquiring the first custom queue according to the attribute information.

8. The method according to claim 1, wherein displaying the first page according to the M custom queues comprises:
   acquiring sequences of the M custom queues; and
   displaying the first page according to the sequences and the M custom queues.

9. The method according to claim 8, wherein displaying the first page according to the sequences and the M custom queues comprises:
   when M is greater than a preset number, determining a preset number of preceding custom queues as the N custom queues according to the sequences, and displaying the first page according to the N custom queues; and
   when M is smaller than or equal to the preset number, determining the M custom queues as the N custom queues according to the sequences, and displaying the first page according to the N custom queues.

10. The method according to claim 8, wherein acquiring the sequences of the M custom queues comprises:
    acquiring the sequences of the M custom queues according to a generation time of the each custom queue; or,
    in response to a first operation of a user, acquiring the sequences of the M custom queues.

11. The method according to claim 1, wherein the first page is a home page of the music application.

12. The method according to claim 1, wherein the queue is a radio station, an album, or a playlist.

13. A music playing apparatus, comprising:
    at least one processor; and
    a memory communicatively connected to the at least one processor; wherein,
    the memory stores instructions executable by the at least one processor, and the instructions are executed by the at least one processor, so that the at least one processor is configured to:
    display a first page of a music application, wherein the first page comprises at least one custom queue, and each custom queue comprises at least one piece of music to be played;
    acquire a first instruction acting on the custom queue; and
    play the music to be played in the custom queue according to the first instruction;
    wherein the at least one processor is configured to:
    acquire M preset custom queues, wherein M is an integer greater than 0; and display the first page according to the M custom queues, wherein the first page comprises N custom queues of the M custom queues, N is an integer greater than 0, and M is greater than or equal to N.

14. The music playing apparatus according to claim 13, wherein the at least one processor is configured to:
   acquire a second instruction; and
   acquire the first custom queue according to the second instruction.

15. The music playing apparatus according to claim 14, wherein the second instruction is a click instruction, and the at least one processor is configured to:
   acquire the first custom queue according to the click instruction acting on the first custom queue.

16. The music playing apparatus according to claim 14, wherein the second instruction is a search instruction, and the at least one processor is configured to:
   acquire at least one preset condition in the search instruction; and
   acquire the first custom queue according to the at least one preset condition.

17. The music playing apparatus according to claim 13, wherein the at least one processor is configured to:
   acquire sequences of the M custom queues; and
   display the first page according to the sequences and the M custom queues.

18. A non-transitory computer-readable storage medium including computer-executable instructions stored thereon, wherein the computer-executable instructions, when executed by a processor, cause the processor to:
   display a first page of a music application, wherein the first page comprises at least one custom queue, and each custom queue comprises at least one piece of music to be played;
   acquire a first instruction acting on the custom queue; and
   play the music to be played in the custom queue according to the first instruction;
   wherein the computer-executable instructions, when executed by the processor, cause the processor to:
   acquire M preset custom queues, wherein M is an integer greater than 0; and
   display the first page according to the M custom queues, wherein the first page comprises N custom queues of the M custom queues, N is an integer greater than 0, and M is greater than or equal to N.

* * * * *